US012634428B2

(12) United States Patent
Goldfriend et al.

(10) Patent No.: US 12,634,428 B2
(45) Date of Patent: May 19, 2026

(54) THERMAL REFERENCE CORRECTION

(71) Applicant: APPLE INC., Cupertino, CA (US)

(72) Inventors: Nir Goldfriend, Tel Aviv (IL); Yuval Vardi, Tel Aviv (IL); David Pawlowski, Tel Aviv (IL); Roey Zuitlin, Kfar Bin Nun (IL); Gidi Lasovski, Ramat Hasharon (IL); Boris Morgenstein, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 18/479,848

(22) Filed: Oct. 3, 2023

(65) Prior Publication Data

US 2025/0113017 A1      Apr. 3, 2025

(51) Int. Cl.
| | |
|---|---|
| *H04N 13/271* | (2018.01) |
| *H04N 13/254* | (2018.01) |
| *H04N 13/296* | (2018.01) |

(52) U.S. Cl.
CPC ......... *H04N 13/271* (2018.05); *H04N 13/254* (2018.05); *H04N 13/296* (2018.05)

(58) Field of Classification Search
CPC ..... H04N 13/254; G06T 7/521; G06V 10/145
See application file for complete search history.

(56) References Cited

U.S. PATENT DOCUMENTS

| | | | |
|---|---|---|---|
| 8,493,496 | B2 | 7/2013 | Freedman et al. |
| 8,749,796 | B2 | 6/2014 | Pesach et al. |
| 9,400,177 | B2 | 7/2016 | Pesach |
| 10,312,656 | B1 * | 6/2019 | Bardagjy .................. G06T 7/97 |
| 10,957,059 | B1 | 3/2021 | Katz et al. |
| 11,381,729 | B1 | 7/2022 | Poloniewicz et al. |
| 11,523,055 | B1 | 12/2022 | Chaudhri et al. |
| 11,856,180 | B1 * | 12/2023 | Morgenstein .......... G06T 7/521 |
| 2008/0165341 | A1 | 7/2008 | Dillon et al. |
| 2010/0007717 | A1 | 1/2010 | Spektor et al. |

(Continued)

OTHER PUBLICATIONS

Macworld, "Face ID on the iPhone X: Everything you need to know about Apple's face recognition", pp. 1-10, Dec. 24, 2017 downloaded from https://www.macworld.com/article/230490/face-id-iphone-x-faq.html#primary.

(Continued)

*Primary Examiner* — Jayanti K Patel
*Assistant Examiner* — Christopher Kingsbury Glover
(74) *Attorney, Agent, or Firm* — Meitar Patents LTD.; Daniel Kligler

(57) ABSTRACT

A method for depth mapping includes operating a projector at a first temperature to project a pattern of optical radiation onto a reference plane, capturing a first image of the projected pattern on the reference plane, using the first image and an optical and thermal model of the projector to compute multiple reference images associated with different respective temperatures of the projector. Using the projector, the pattern is projected onto a scene, and a temperature of the projector is measured while projecting the pattern. The method further includes capturing a second image of the projected pattern on the scene, selecting one of the reference images responsively to the measured temperature; and computing a depth map of the scene by comparing the pattern in the second image to the selected one of the reference images.

16 Claims, 11 Drawing Sheets

(56) References Cited

U.S. PATENT DOCUMENTS

| | | | |
|---|---|---|---|
| 2012/0050488 A1 | 3/2012 | Cohen et al. | |
| 2015/0124055 A1* | 5/2015 | Kotake .............. | G01B 11/2513 |
| | | | 348/46 |
| 2015/0206325 A1 | 7/2015 | Furihata | |
| 2017/0094255 A1* | 3/2017 | Zabatani ................... | G06T 5/80 |
| 2017/0097417 A1 | 4/2017 | Wang | |
| 2017/0272651 A1 | 9/2017 | Mathy et al. | |
| 2018/0033146 A1 | 2/2018 | Bleyer et al. | |
| 2019/0231220 A1 | 8/2019 | Refai et al. | |
| 2019/0304121 A1 | 10/2019 | Wang et al. | |
| 2019/0339369 A1 | 11/2019 | Fenton et al. | |
| 2020/0033113 A1 | 1/2020 | Slettemoen | |
| 2020/0068102 A1 | 2/2020 | Tilleman | |
| 2020/0404243 A1* | 12/2020 | Saphier ................ | A61C 9/0053 |
| 2021/0192243 A1 | 6/2021 | Lin et al. | |
| 2021/0203894 A1* | 7/2021 | Lu ........................ | H04N 9/3105 |
| 2022/0364849 A1 | 11/2022 | Yosub et al. | |
| 2023/0068727 A1 | 3/2023 | Saphier et al. | |
| 2023/0085063 A1 | 3/2023 | Ginzburg et al. | |

OTHER PUBLICATIONS

Yosub et al., U.S. Appl. No. 17/944,207, filed Sep. 14, 2022.

* cited by examiner

X-pixels

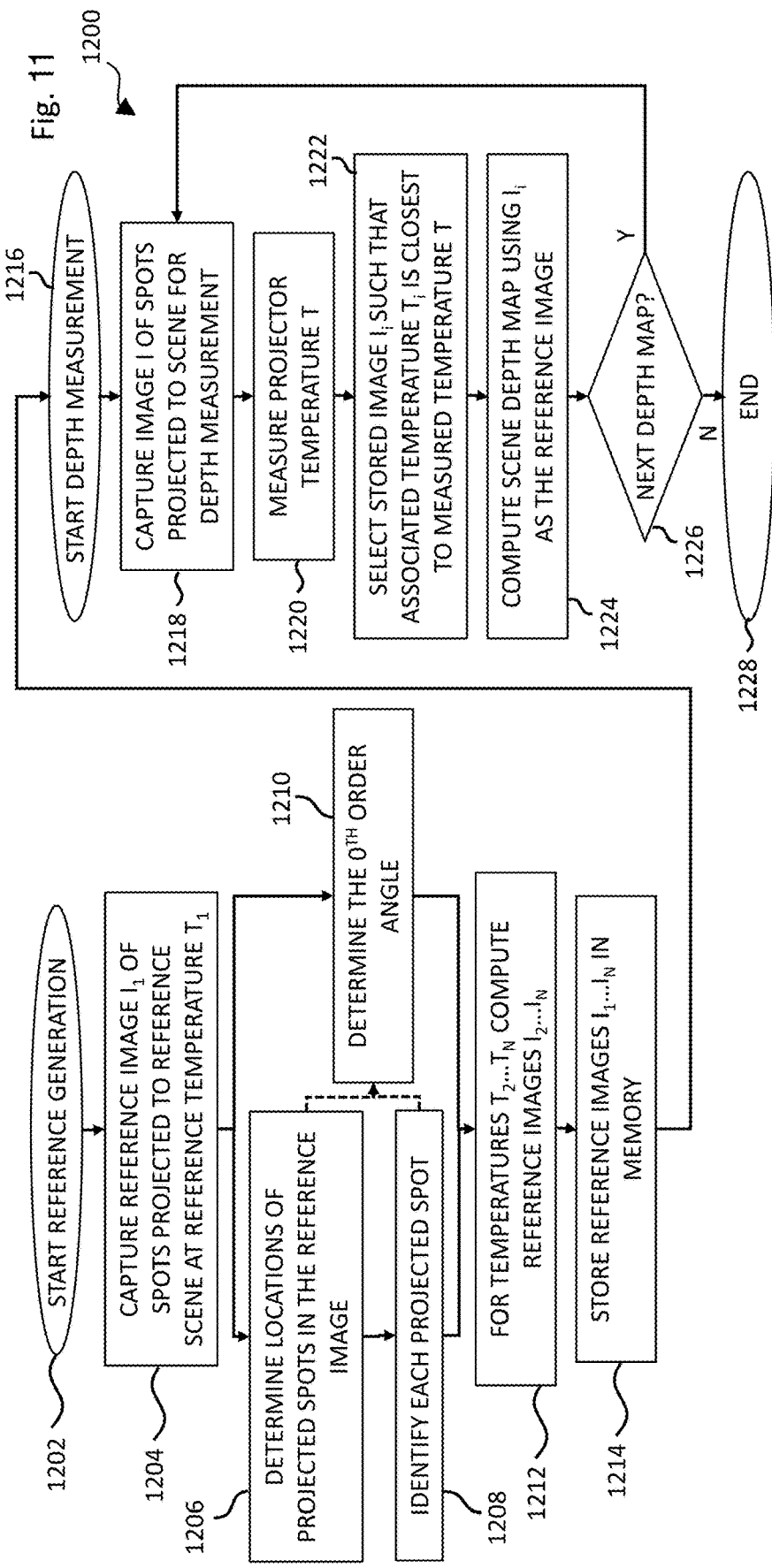

1216   START DEPTH MEASUREMENT

1218   CAPTURE IMAGE I OF SPOTS PROJECTED TO SCENE FOR DEPTH MEASUREMENT

1220   MEASURE PROJECTOR TEMPERATURE T

1222   SELECT STORED IMAGE $I_i$ SUCH THAT ASSOCIATED TEMPERATURE $T_i$ IS CLOSEST TO MEASURED TEMPERATURE T

1224   COMPUTE SCENE DEPTH MAP USING $I_i$ AS THE REFERENCE IMAGE

1226   NEXT DEPTH MAP?

1228   END

1202   START REFERENCE GENERATION

1204   CAPTURE REFERENCE IMAGE $I_1$ OF SPOTS PROJECTED TO REFERENCE SCENE AT REFERENCE TEMPERATURE $T_1$

1206   DETERMINE LOCATIONS OF PROJECTED SPOTS IN THE REFERENCE IMAGE

1210   DETERMINE THE $0^{TH}$ ORDER ANGLE

1208   IDENTIFY EACH PROJECTED SPOT

1212   FOR TEMPERATURES $T_2...T_N$ COMPUTE REFERENCE IMAGES $I_2...I_N$

1214   STORE REFERENCE IMAGES $I_1...I_N$ IN MEMORY

THERMAL REFERENCE CORRECTION

FIELD OF THE INVENTION

The present invention relates generally to methods and systems for three-dimensional (3D) mapping, and specifically to pattern-based depth mapping.

BACKGROUND

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods are based on projecting a pattern of structured light onto an object or scene that is to be mapped, for example a pattern of spots. A camera captures an image of the projected pattern. A processor finds local disparities between the pattern in the captured image and a reference pattern captured at a known distance from the camera. Based on the local disparities, the processor computes a depth map of the object or scene.

The terms "light" and "optical radiation" are used interchangeably in the present description and in the claims to refer to electromagnetic radiation in any of the visible, infrared, and ultraviolet ranges of the spectrum.

SUMMARY

Embodiments of the present invention that are described hereinbelow provide improved methods for depth mapping using structured light, as well as devices and systems implementing such methods.

There is therefore provided, in accordance with an embodiment of the invention, a method for depth mapping, which includes operating a projector at a first temperature to project a pattern of optical radiation onto a reference plane, capturing a first image of the projected pattern on the reference plane, and using the first image and an optical and thermal model of the projector to compute multiple reference images associated with different respective temperatures of the projector. Using the projector, the pattern is projected onto a scene, and a temperature of the projector is measured while projecting the pattern. The method further includes capturing a second image of the projected pattern on the scene, selecting one of the reference images responsively to the measured temperature, and computing a depth map of the scene by comparing the pattern in the second image to the selected one of the reference images.

In a disclosed embodiment, selecting one of the reference images includes selecting a reference image having a respective associated temperature that is closest to the measured temperature.

In another embodiment, projecting the pattern includes projecting multiple spots at respective locations, and computing the multiple reference images includes correcting the respective locations of the spots responsively to the respective temperatures.

In yet another embodiment, the projector includes one or more emitters, which emit respective beams of the optical radiation, and a diffractive optical element, which directs the beams to create the pattern. Additionally, the diffractive optical element may include a metasurface optical element. Further additionally or alternatively, the diffractive optical element is configured to split the beams to create multiple tiles within the pattern, each tile including a respective set of the spots. Additionally or alternatively, the diffractive optical element has an effective focal length, and computing the multiple reference images includes correcting the reference images for variations of the effective focal length of the diffractive optical element as a function of the respective temperatures and optical radiation wavelengths. Further additionally or alternatively, the one or more emitters emit the respective beams at respective wavelengths, which vary with the temperature, and correcting the reference images includes correcting for further variations of the effective focal length of the diffractive optical element as a function of the wavelengths.

In a disclosed embodiment, the projector includes multiple emitters emitting the optical radiation at respective wavelengths, and computing the multiple reference images includes using a thermal model of the multiple emitters to compute changes in the respective wavelengths of the multiple emitters at the different respective temperatures.

In another embodiment, computing the multiple reference images includes modeling changes in the pattern at the different respective temperatures using a kinoform lens model in an NA-space.

In yet another embodiment, the projector includes one or more emitters, which emit respective beams of the optical radiation, and an optical element that applies a tilt angle to the beams, wherein the tilt angle is dependent on the temperature and on a wavelength of the beams, and wherein computing the multiple reference images includes correcting for variations in the tilt angle as a function of the temperature.

In a further embodiment, computing the multiple reference images includes computing extended reference images including at least two spot patterns that are stitched together, wherein correcting for the variations in the tilt angle creates a smooth stitching between the at least two spot patterns.

There is also provided, in accordance with an embodiment of the invention, a depth mapping device, including a projector, which is configured to project a pattern of optical radiation onto a field of view, a camera, which is configured to capture images of the projected pattern within the field of view, a thermal sensor configured to measure a temperature of the projector, and a processor. The processor is configured to receive from the camera a first image of the pattern projected onto a reference plane at a first measured temperature of the projector, to compute, using the first image and an optical and thermal model of the projector, multiple reference images associated with different respective temperatures of the projector, to receive from the camera a second image of the pattern projected onto a scene at a second measured temperature of the projector, to select one of the reference images responsively to the second measured temperature, and to compute a depth map of the scene by comparing the pattern in the second image to the selected one of the reference images.

The present invention will be more fully understood from the following detailed description of the embodiments thereof, taken together with the drawings in which:

BRIEF DESCRIPTION OF THE DRAWINGS

FIG. 11 is a flowchart that schematically illustrates a method for generating and using thermally corrected reference patterns for depth mapping, in accordance with an embodiment of the invention.

DETAILED DESCRIPTION OF EMBODIMENTS

Overview

Figure 1:
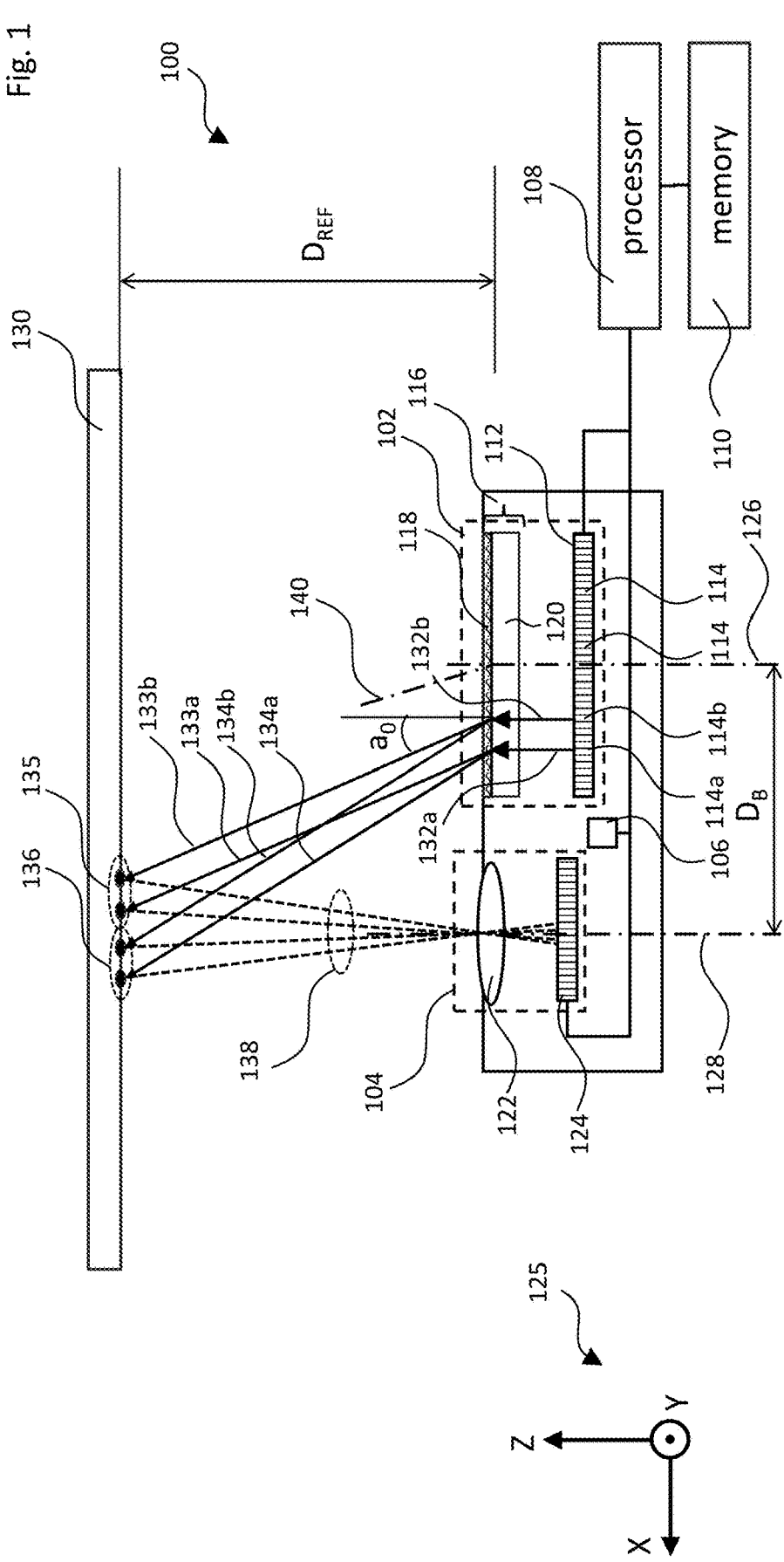
FIGS. 1-2 are schematic side views of a depth mapping device, in accordance with an embodiment of the invention.

Devices for depth mapping based on structured light typically comprise a projector, which projects a pattern of optical radiation, such as a pattern of spots, along a projection axis onto a target area. A camera, which is offset transversely from the projector, captures images of the target area about a camera axis. A processor compares the pattern appearing in the captured images to a reference image of the pattern in order to generate depth maps of objects in the images. The known transverse offset between the projector and the camera enables the processor to convert the local disparities between the image pattern and the reference pattern into depth coordinates.

In some devices, the projection optics of the projector comprise diffractive optics including one or more optical metasurfaces. Optical metasurfaces are thin layers that comprise a two-dimensional pattern of structures, having dimensions (pitch and thickness) less than the target wavelength of the radiation with which the metasurface is designed to interact. Optical elements comprising optical metasurfaces are referred to herein as "metasurface optical elements" (MOEs). The advantages of using an MOE for the projection optics include simple, lightweight optical construction, as well as design flexibility.

However, the optical behavior of MOEs (as well as other diffractive optical elements) depends on the wavelength of optical radiation projected by the projector. The wavelength, in turn, can vary with the temperature of the projector, as will be further detailed hereinbelow. Additionally, the optical behavior of the MOE itself may depend directly on the temperature, depending on the materials used for constructing the MOE. This temperature-dependent behavior will change the projected pattern of optical radiation. If a reference image of the projected pattern, captured at a fixed temperature, were used for the comparison of the images of the scene captured at a different temperature, a systematic error would be introduced in the conversion of the local disparities between the image pattern and the reference pattern into depth coordinates. In principle, one might consider capturing and storing multiple reference images at different temperatures and then choosing the reference image most closely corresponding to the temperature at which a specific scene image was captured. This approach, however, is not cost-effective for mass-produced pattern projectors.

Some embodiments of the present invention that are described herein address this problem in depth-mapping devices based on pattern projectors that comprise an array of emitters and MOE-based projection optics, along with a camera that captures images of the projected pattern. The camera captures a first reference image at a known temperature. Using an optical and thermal model of the projection optics and the known thermal behavior of the array of emitters, a processor computes additional reference images for a series of temperatures, and stores these reference images in a memory coupled to the processor. When measuring a depth map of a given scene, the temperature of the projector is measured with an integral thermal sensor, and the depth map is computed by comparing the captured image of the scene to the stored reference map most closely associated with the temperature of the projector.

System Description

Figure 2:
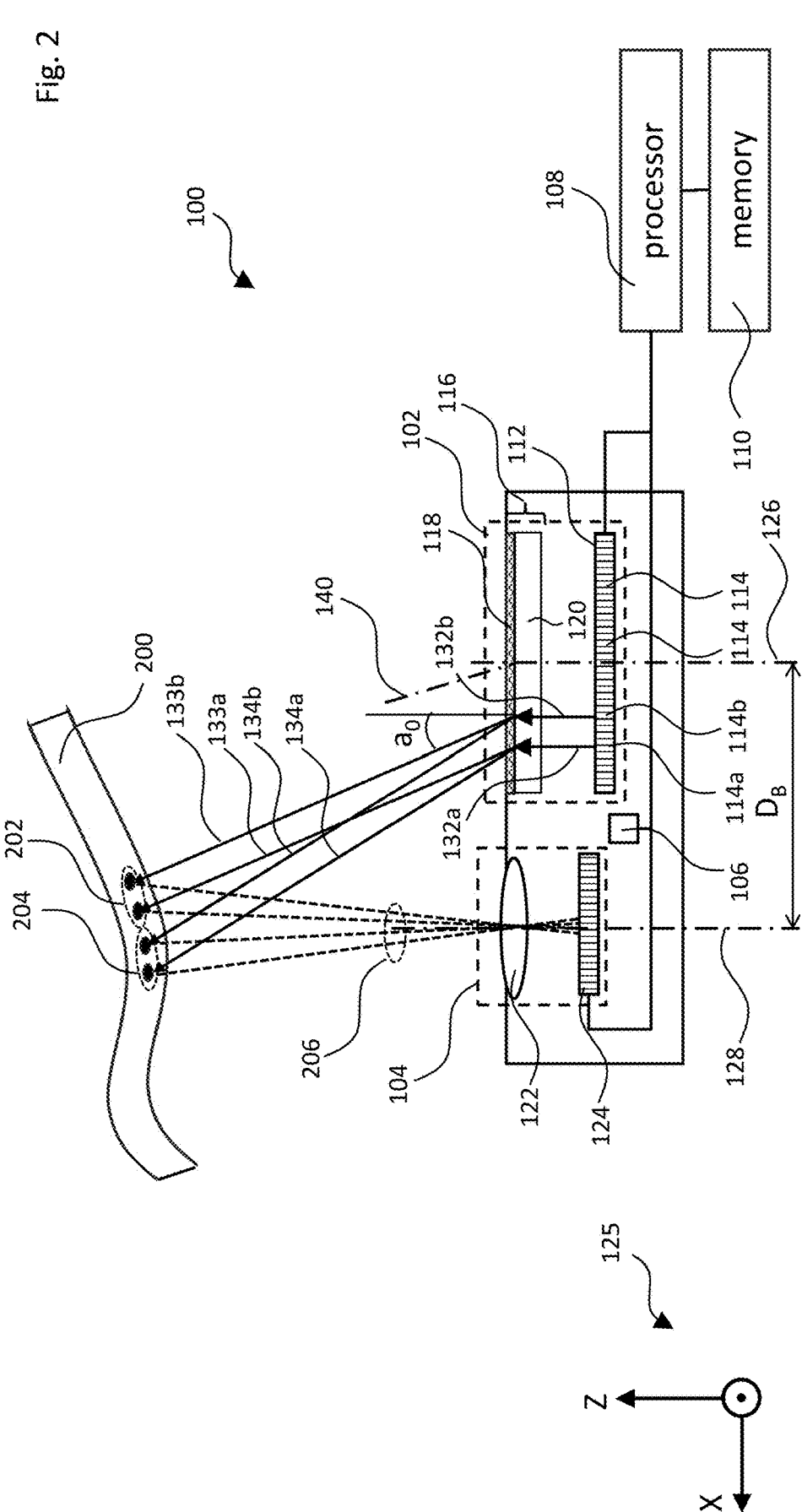

FIGS. 1-2 are schematic side views of a depth mapping device 100, in accordance with an embodiment of the invention. FIG. 1 shows the preparation of device 100 for measuring depth maps at different temperatures, and FIG. 2 shows the measurement of a depth map.

Figure 4:
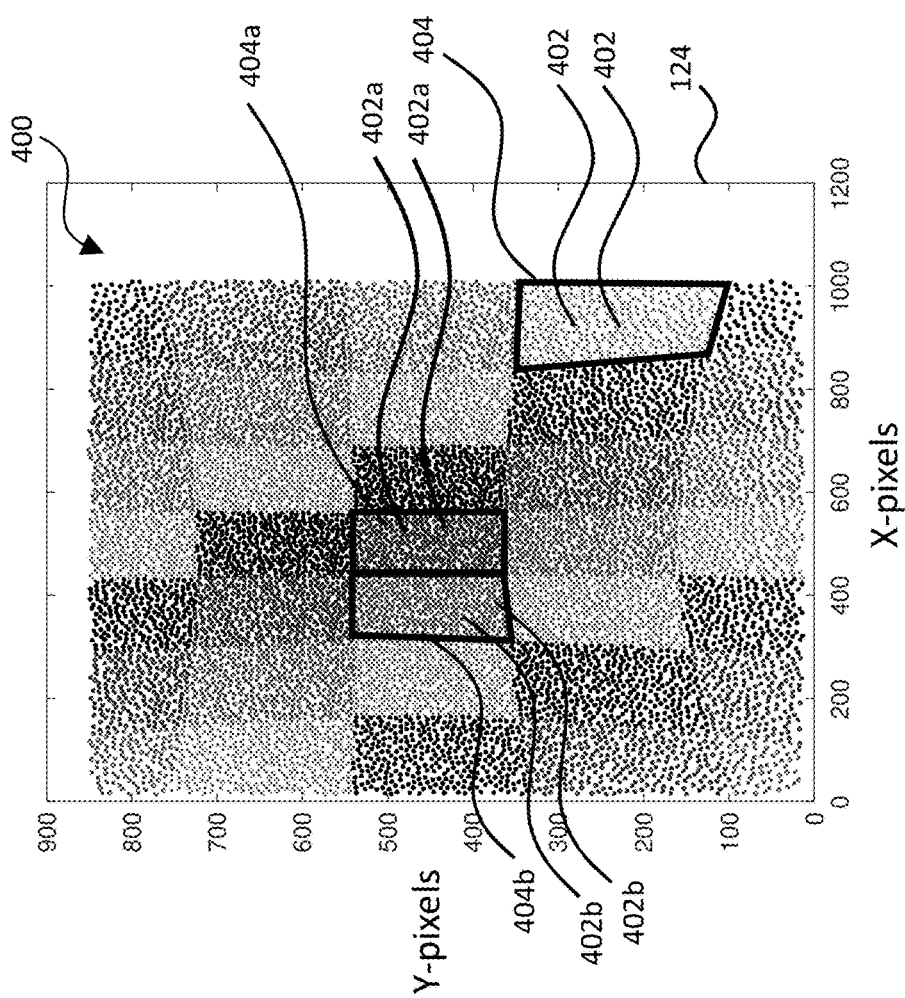
FIG. 4 is a schematic frontal view of an image of a projected spot pattern captured by a pixelated image sensor, in accordance with an embodiment of the invention.
Figure 4:
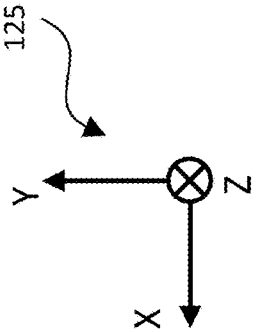

Depth mapping device 100 comprises a projector 102, a camera 104, a thermal sensor 106, a processor 108, and a memory 110. Projector 102 comprises a two-dimensional emitter array 112, comprising emitters 114, for example vertical-cavity surface-emitting lasers (VCSELs). (Although emitter array 112 is shown in FIGS. 1 and 2, for the sake of clarity, as a regular array of emitters 114, the array may comprise a random or pseudo-random array of emitters, as shown in FIG. 4 and subsequent figures.) Projector 102 further comprises an MOE 116 having an effective focal length f (also referred to herein simply as "focal length"), comprising a metasurface 118 deposited on a substrate 120 that is transparent at the wavelengths of optical radiation emitted by emitters 114, for example in the near infrared range. Camera 104 comprises imaging optics 122 and a pixelated image sensor 124, such as a charge-coupled device (CCD) or complementary metal-oxide semiconductor (CMOS) sensor. Thermal sensor 106 comprises, for example, a thermistor.

Cartesian coordinates 125 are used for establishing reference directions in FIG. 1 and in the subsequent figures. Projector 102 has a projector axis 126, and camera 104 has a camera axis 128, both in the Z-direction, with the two axes separated by a transverse offset $D_B$.

Processor 108 is coupled to emitter array 112, image sensor 124, thermal sensor 106, and memory 110. Processor 108 typically comprises a programmable processor, which is programmed in software and/or firmware to carry out the functions and computations that are described herein.

Alternatively or additionally, processor 108 comprises hard-wired and/or programmable hardware logic circuits, which carry out at least some of the functions of the processor. Although processor 108 is shown in the figure, for the sake of simplicity, as a single, monolithic functional block, in practice the processor may comprise a single chip or a set of two or more chips, with suitable interfaces for receiving and outputting the signals that are described in the text.

Memory 110 comprises writable and readable memory, for example, a solid-state memory, a magnetic or optomagnetic disc, or a magnetic memory. Although memory 110 is shown in the figure, for the sake of simplicity, as a single, monolithic functional block, in practice the memory may comprise a single unit or a set of two or more units, with suitable interfaces for receiving and outputting the signals from and to processor 108. Alternatively, memory 110 may be integrated into processor 108.

In preparation for measuring depth maps of scenes at different temperatures, depth mapping device 100 is pointed toward a flat screen 130 at a known distance $D_{REF}$, as shown in FIG. 1. Emitters 114 emit beams of optical radiation, with example beams 132a and 132b shown as emitted by respective emitters 114a and 114b. Beams 132a and 132b impinge on MOE 116, which diffracts the beams in the described embodiment into orders 0, ±1, ±2, ±3 in the X-direction and into orders 0, ±1, ±2 in the Y-direction. (In alternative embodiments, the number of diffracted orders in both X- and Y-directions may be lower or higher.) For the sake of clarity, only the $0^{th}$ and $+1^{st}$ orders of the diffracted beams in the X-direction are shown, however, with a beam 133a representing the $0^{th}$ diffracted order of beam 132a, a beam 133b representing the $0^{th}$ order of beam 132b, a beam 134a representing the $+1^{st}$ order of beam 132a, and a beam 134b representing the $+1^{st}$ order of beam 132b.

Figure 5:
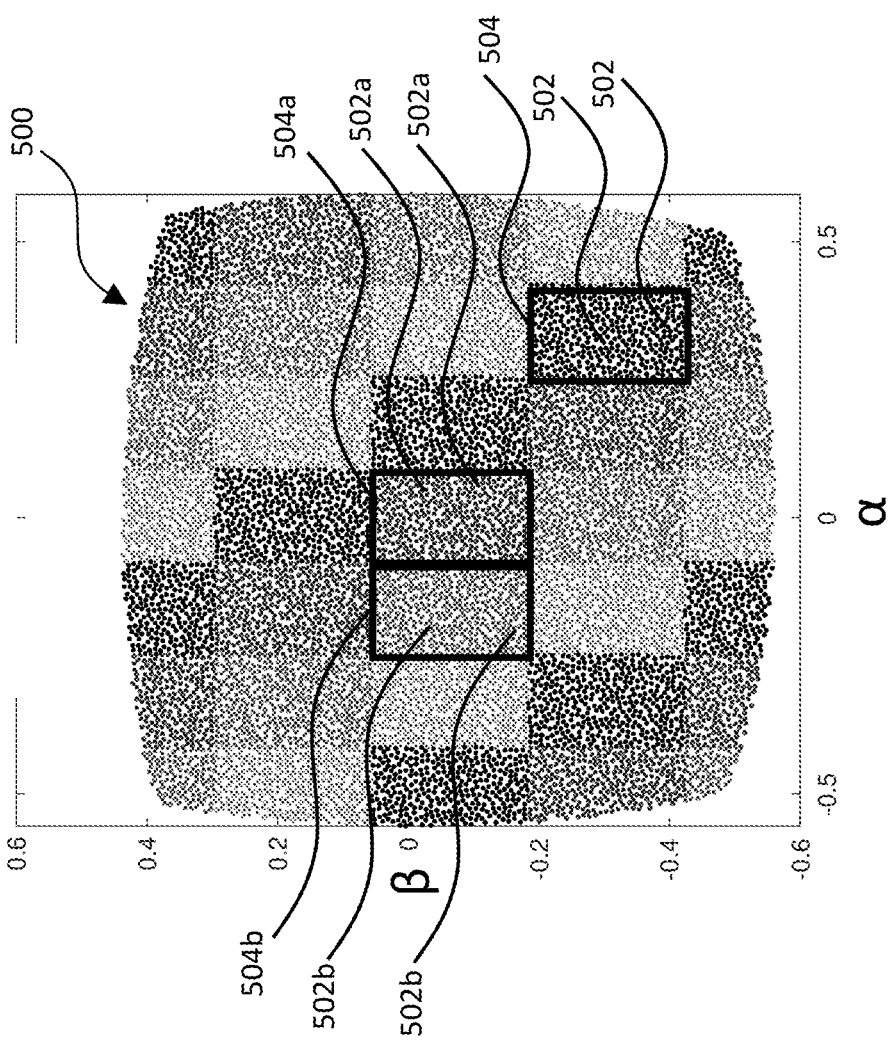
FIG. 5 is a schematic view of a projected spot pattern in an NA-space, in accordance with an embodiment of the invention.

Beams 133a and 133b form illumination spots 135 on scene 130, and beams 134a and 134b form illumination spots 136 on the scene. (As is shown in FIGS. 4 and 5, the number of emitters 114 and thus the number of spots on scene 130 is typically much higher than in FIGS. 1 and 2. Furthermore, the spots due to the diffracted orders form respective two-dimensional tiles, reflecting the two-dimensional arrangement of emitters 114 in array 112.)

In order for the illuminated spots on screen 130 (or any general scene) to have a sufficient overlap with the field of view of camera 104, MOE 116 adds a tilt angle $a_0$ to the $0^{th}$ diffracted order. This tilt angle adds the same relative tilt to all the diffracted orders, thus shifting the illuminated spots toward the field of view of camera 104. Tilt angle $a_0$ also defines a projection axis 140 (separately from projector axis 126) as the direction of projection of all $0^{th}$ order beams.

Camera 104 captures images of spots 136a and 136b (as well as spots from all the other emitted beams), shown schematically by rays 138, and conveys the image data to processor 108. Processor 108 further receives from thermal sensor 106 the temperature $T_1$ at which the images of the spots were captured. The images of the spots at temperature $T_1$ form a first reference image $I_1$. From reference image $I_1$, together with the optical and thermal models described in the section entitled "Thermal behavior of the MOE-based depth mapping device" hereinbelow and the thermal characteristics of emitter array 112, processor 108 computes a series of reference images $I_2$, $I_3$, . . . , $I_N$, corresponding to temperatures $T_2$, $T_3$, . . . , $T_N$. Here N is an integer, and the temperatures are chosen to span the expected thermal range in which device 100 will be used. Processor 108 stores the N reference images $I_1$, . . . , $I_N$ in memory 110.

In FIG. 2, device 100 is pointed toward a scene 200 for measuring its depth map. Items identical to those in FIG. 1 are labelled with the same labels. As in FIG. 1, emitters 114 emit beams of optical radiation, with beam 132a emitted by emitter 114a and beam 132b emitted by emitter 114b. Further as in FIG. 1, beams 132a and 132b diffract in the X-direction into $0^{th}$ order beams 133a and 133b and $+1^{st}$ order beams 134a and 134b. Beams 132a and 132b form illumination spots 202 on scene 200, and beams 133a and 133b form illumination spots 204 on the scene. Camera 104 captures images of the spots, as indicated by rays 206, and conveys them to processor 108. In general, scene 200 is not flat (unlike screen 130 in FIG. 1), and is located at a distance that may be larger or smaller than $D_{REF}$. Thus, spots 202 and 204 (as well as the spots illuminated by rays from other emitters 114) fall on scene 200 in different locations from the spots in FIG. 1.

Processor 108 receives from camera 104 an image I of the illuminated spots on scene 200. Processor 108 further receives from thermal sensor 106 a signal indicating the temperature T of projector 102 at the time of the capture of image I. Processor 108 retrieves from memory 110 a stored reference image $I_i$ such that of the temperatures $T_1$, . . . , $T_N$ the temperature $T_i$ corresponding to image $I_i$ is closest to the temperature T. Processor 108 now extracts the local disparities between the spots in the captured image I and the corresponding spots in reference image $I_i$. The known transverse offset $D_B$ enables processor 108 to convert the local disparities between the image pattern and the reference pattern into local depth coordinates of scene 200.

Spot Patterns

Figure 3:
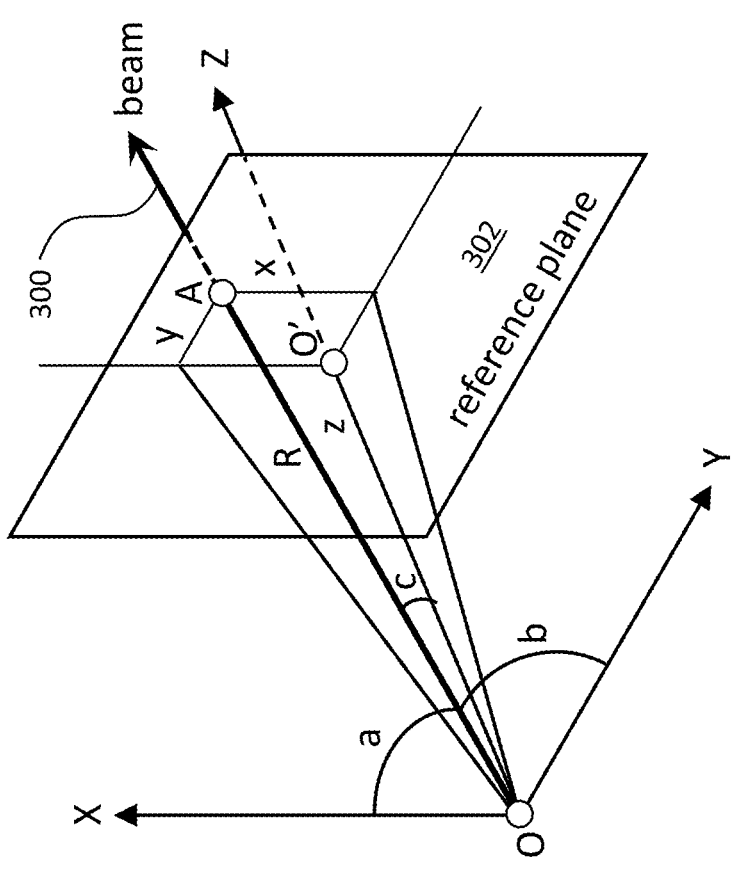
FIG. 3 shows schematically two coordinate systems used to represent the spot patterns generated by the depth mapping device of FIGS. 1-2, in accordance with an embodiment of the invention.

FIG. 3 shows schematically two coordinate systems used to represent the spot patterns generated by device 100, in accordance with an embodiment of the invention.

A beam 300 originates from an origin O of Cartesian coordinates 125 (FIG. 1). A reference plane 302 is parallel to the XY-plane of Cartesian coordinates 125 and intercepts the Z-axis at a point 0', at a distance z from the origin O. Beam 300 intercepts plane 302 at a point A with Cartesian coordinates (x,y,z) at a distance R from origin O. Thus, $$R = \sqrt{x^2 + y^2 + z^2}.$$ [Eqn. 1]

The direction cosines $\alpha$, $\beta$, and $\gamma$ of beam 300 are defined as the cosines of the angles a, b, and c between the beam and the respective X-, Y-, and Z-axes. The direction cosines may be calculated from the Cartesian coordinates (x, y, z) as $$\alpha = x/R,$$ [Eqn. 2a]

$$\beta = y/R, \text{ and}$$ [Eqn. 2b]

$$\gamma = z/R.$$ [Eqn. 2c]

Consequently, the direction cosines are tied together by the relationship:

$$\alpha^2 + \beta^2 + \gamma^2 = 1$$ [Eqn. 3]

A beam with direction cosines $(\alpha_0, \beta_0)$, impinging on a diffraction grating with grating periods $(d_x, d_y)$ in respective x- and y-directions, is diffracted into a beam with direction cosines given by $$\alpha_n = \alpha_0 + n\lambda/d_x \text{ and}$$ [Eqn. 4a]

$$\beta_m = \beta_0 + m\lambda/d_y,$$ [Eqn. 4b]

wherein n and m refer to the diffraction orders, and λ is the wavelength of the optical radiation. The direction cosine $\gamma_{mn}$ of the diffracted beam with respect to the Z-axis is given, according to Eqn. 3, by $$\gamma_{nm} = \sqrt{1 - \alpha_n^2 - b_m^2}.$$ [Eqn. 5]

FIG. 4 is a schematic frontal view of an image of a projected spot pattern 400 captured by pixelated image sensor 124, in accordance with an embodiment of the invention. The pixels of sensor 124 are indicated by the axes "X-pixels" and "Y-pixels." MOE 116 diffracts and projects the beams of optical radiation from emitters 114 (FIG. 1) to form spots 402 on a scene, with each diffraction order landing within a respective tile 404 (outlined with a black line). For example, the $0^{th}$ order beams, including beams 133a and 133b, form spots 402a within a tile 404a. The $+1^{st}$ order beams, including beams 134a and 134b, form spots 402b within a tile 404b. Each of tiles 404 abuts the adjacent tiles, thus covering a contiguous field on the scene. Due to the fact that the diffraction equations 4a-4b are linear in direction cosines, and thus non-linear in Cartesian coordinates, tiles 404 have non-rectangular shapes in the Cartesian (spatial) coordinates of sensor 124.

FIG. 5 is a schematic view of a spot pattern 500 in an NA-space, in accordance with an embodiment of the invention. The term "NA-space" refers to a space in which the coordinates are given in direction cosines. The coordinate axes for spot pattern 500 are labelled by the X- and Y-direction cosines α and β. Similarly to FIG. 4, MOE 116 diffracts and projects the beams of optical radiation from emitters 114 (FIG. 1) to form spots 502, with each diffraction order landing within a respective tile 504 and the tiles abutting each other. Specifically, the $0^{th}$ order beams, including beams 133a and 133b, form spots 502a within a tile 504a. The $+1^{st}$ order beams, including beams 134a and 134b, form spots 502b within a tile 504b. Due to the linearity of diffraction equations 4a-4b in the NA-space, tiles 504 are rectangular and of equal size (as opposed to tiles 404 in FIG. 4).

Thermal Behavior of Moe-Based Depth Mapping Device

This section describes the thermal behavior of depth mapping device 100, in accordance with an embodiment of the invention. U.S. patent application Ser. No. 17/810,098, filed Jun. 30, 2022, whose disclosure is incorporated herein by reference, describes a technique for image thermal correction. Embodiments of the present invention apply and improve on this technique.

MOE 116 bends and splits beams of optical radiation based on diffraction, with the diffraction angles depending on the wavelength of the radiation emitted by emitters 114 of projector 102 (FIG. 1). The wavelength of the optical radiation emitted by a specific emitter 114 depends, in turn, on the temperature of that emitter. Additionally, the optical behavior of MOE 116 may depend on the effect of temperature on the material of substrate 120, such as thermal expansion or contraction.

FIGS. 6-9 schematically show changes of spot patterns in a reference image due to wavelength changes, in accordance with embodiments of the invention. FIGS. 6A-6B show spot patterns at a nominal wavelength (similarly to FIGS. 4 and 5), and FIGS. 7-9 show spot patterns at changed wavelengths. For the sake of clarity, the various mechanisms impacting the reference image with a change of the wavelength are described hereinbelow separately. However, in reality the reference image is modified by a combined effect of the these mechanisms.

FIGS. 6A, 7A, 8A, and 9A are frontal views of spot patterns projected into the plane of pixelated image sensor 124 (similar to FIG. 4), and FIGS. 6B, 7B, 8B, and 9B are views of spot patterns in the NA-space (similar to FIG. 5).

Figure 6B:
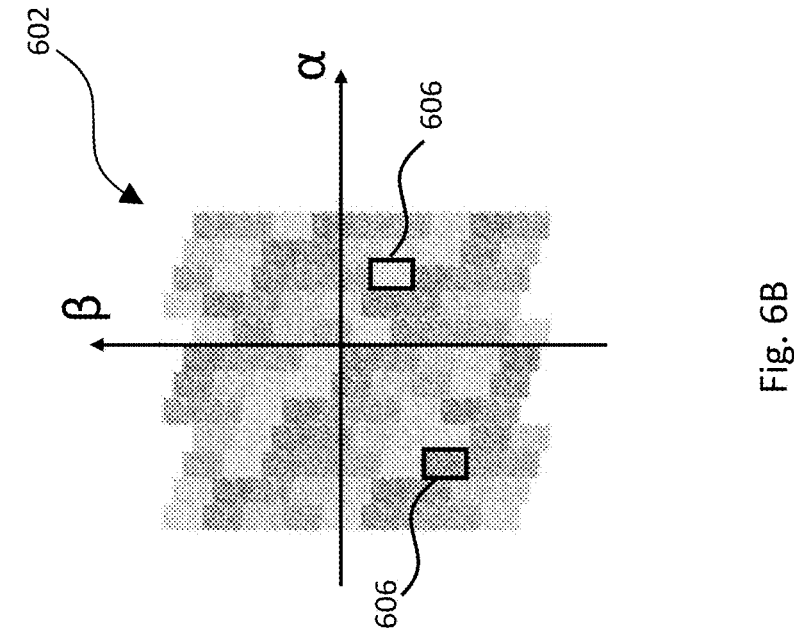
FIGS. 6A, 6B, 7A, 7B, 8A, 8B, 9A and 9B are schematic views of spot patterns in a reference image showing changes in the patterns due to wavelength changes, in accordance with embodiments of the invention.
Figure 6A:
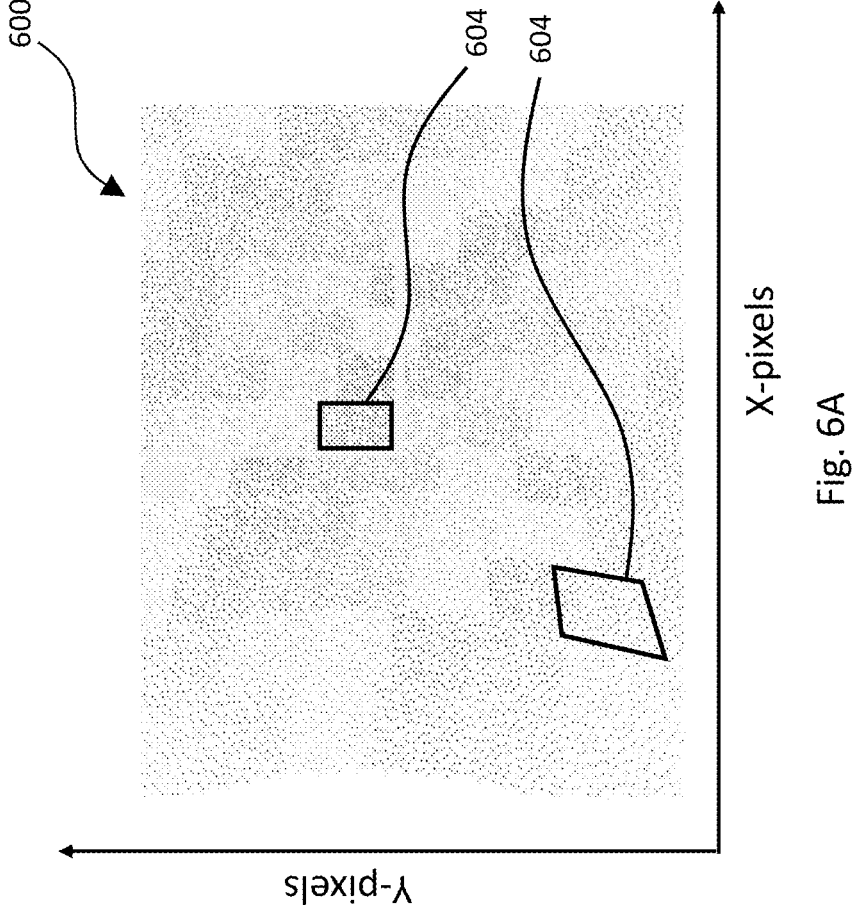

In FIGS. 6A and 6B, respective spot patterns 600 and 602 provide two views of a spot pattern emitted by device 100 at a nominal wavelength $\lambda_0$. Similarly to tiles 404 in FIG. 4, spot pattern 600 comprises abutting, distorted tiles 604. Spot pattern 602 comprises identical rectilinear tiles 606, similar to tiles 504 in FIG. 5.

Figures 7A, 7B:
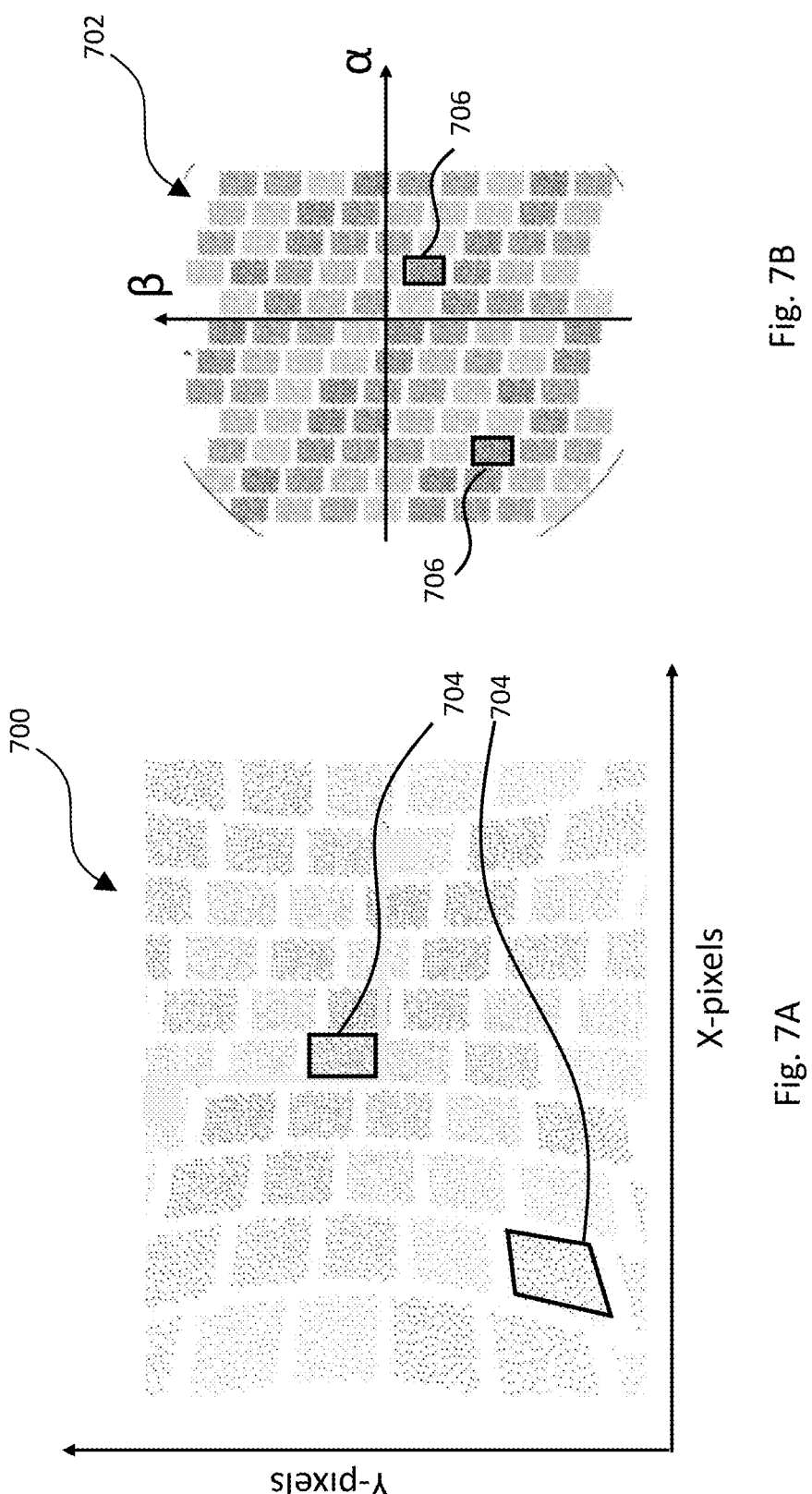

In FIGS. 7A and 7B, respective spot patterns 700 and 702, comprising respective tiles 704 and 706, show the effect of a wavelength $\lambda \approx \lambda_0$ on the diffraction angles, moving the centers of tiles 704 and 706, as compared to the respective tiles 604 and 606 in FIGS. 6A and 6B. In FIGS. 7A-7B, an increased wavelength $\lambda > \lambda_0$ has resulted in an increased distance between the centers of the tiles.

Figures 8A, 8B:
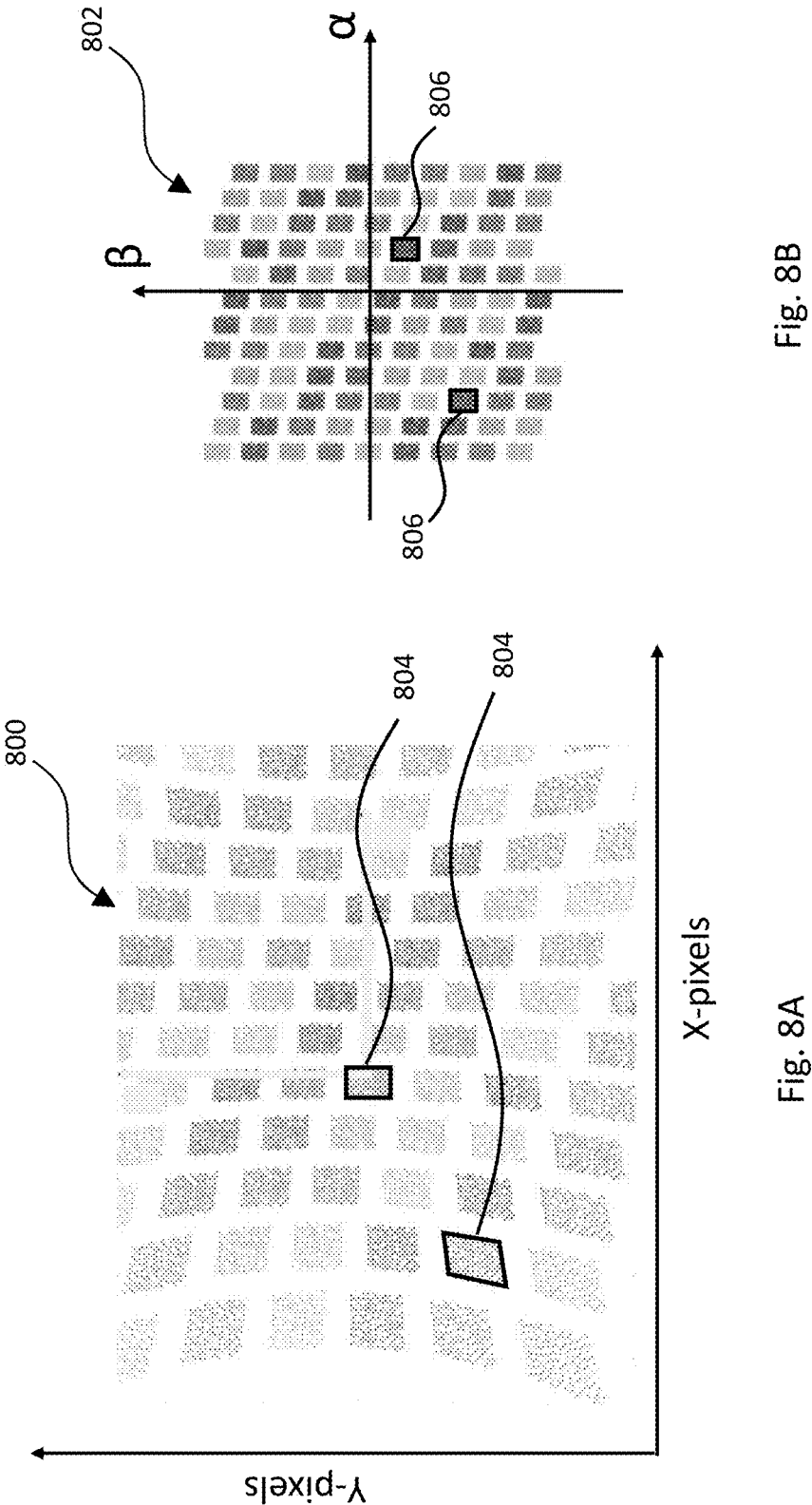

In FIGS. 8A and 8B, respective spot patterns 800 and 802, comprising respective tiles 804 and 806, show the effect of a wavelength $\lambda \approx \lambda_0$ on the effective focal length f of MOE 116 and the concomitant change in the dimensions of the tiles. In FIGS. 8A-8B an increased effective focal length has resulted in a decrease of the sizes of tiles 804 and 806, as compared to the respective tiles 604 and 606.

Figure 9B:
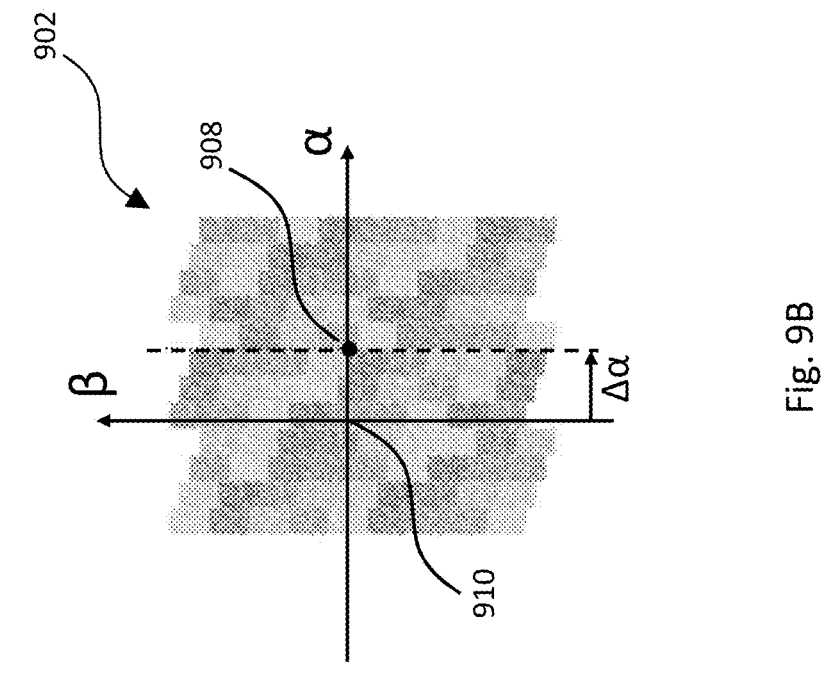
Figure 9A:
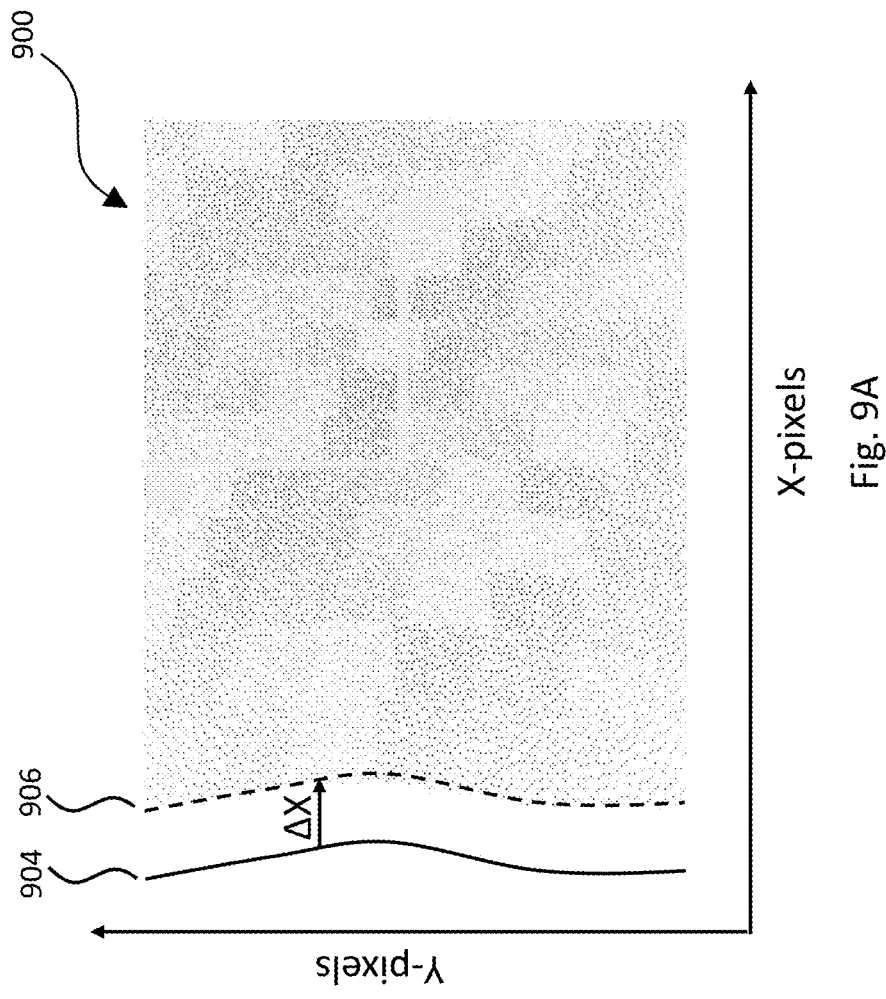

In FIGS. 9A and 9B, respective spot patterns 900 and 902 show the effect of a changed wavelength $\lambda \approx \lambda_0$ on the tilt angle $a_0$ of the $0^{th}$ order (FIG. 1). In FIG. 9A the impact of the change of the tilt angle is seen as a shift ΔX of spot pattern 900 in the positive X-direction. This shift is shown in the figure as the shift between a left edge 904 of spot pattern at the nominal wavelength $\lambda_0$ and a left edge 906 at wavelength λ. In FIG. 9B the impact of the change of the tilt angle is seen as a shift Δα of a center 908 of spot pattern 900 from an origin 910 of the αβ-coordinates.

As the tilt angle $a_0$ is produced by a linear grating part of MOE 116, $\sin(a_0)$ changes linearly with wavelength k from its nominal value sin ($a_0 (\lambda_0)$):

$$[\sin(a_0(\lambda)) - \sin(a_0(\lambda_0))]/\sin(a_0(\lambda_0)) = (\lambda - \lambda_0)/\lambda_0.$$ [Eqn. 6]

For small angles and small changes in wavelength, Eqn. 6 may be written as:

$$\Delta a_0(\lambda)/a_0(\lambda_0) = \Delta\lambda/\lambda_0,$$ [Eqn. 7]

wherein the symbol Δ refers to the differences in angles and wavelengths between λ and $\lambda_0$.

A change in the effective focal length will also change the tilt angle $a_0$ of the $0^{th}$ order, as will be further detailed hereinbelow.

In a general case, the effective focal length f of MOE 116 may depend both directly on the temperature of projector 102 and indirectly on the temperature due to thermal effects on the wavelength of the optical radiation emitted by emitters 114. As each emitter 114 may exhibit a different thermal behavior, the effective focal length f is indexed as $f_i$, wherein the index i refers to the $i^{th}$ emitter 114 and runs through integers $1, \ldots, M$, and M is the number of emitters 114. The thermal behavior of the $i^{th}$ effective focal length $f_i$ may be written in a general form as $$\frac{df_i}{dT} = \frac{\partial f}{\partial T} + \frac{\partial f}{\partial \lambda}\frac{\partial \lambda_i}{\partial T}, \qquad \text{[Eqn. 8]}$$

wherein T is the temperature of projector 102. The non-indexed effective focal length f refers to the base (nominal) focal length of MOE 116. The first term $$\frac{\partial f}{\partial T}$$

describes the thermal behavior of the effective focal length due to material changes, such as expansion of substrate 120 with temperature. As substrate 120 is commonly fabricated from a material with a low coefficient of thermal expansion, such as quartz, this first term will be omitted hereinbelow.

The second term $$\frac{\partial \lambda_i}{\partial T}$$

refers to a thermal model of emitters 114, i.e., the behavior of the wavelength of the emitted radiation as a function of temperature. This model can be based on data provided by the manufacturer for each emitter 114 of emitter array 112, generally in the form of a lookup table. Alternatively, the model may be given in the form of a function.

The effect of a focusing lens with an effective focal length f may be described by a general parabolic phase term as $$\text{Phase} = e^{-i\frac{2\pi}{\lambda f}r^2}, \qquad \text{[Eqn. 9]}$$

wherein r refers to a radial coordinate transverse to the optical axis of the lens. The phase term generated by an MOE may be described using the kinoform lens model, described by the equation:

$$\text{Phase} = e^{-i\frac{1}{d_{MOE}}r^2}, \qquad \text{[Eqn. 10]}$$

wherein $d_{MOE}$ corresponds to the focusing power of the MOE.

Combining Eqns. 9 and 10 yields the effective focal length f as a function of the wavelength:

$$f = \frac{2\pi d_{MOE}}{\lambda}. \qquad \text{[Eqn. 11]}$$

Differentiating Eqn. 11 with respect to wavelength $\lambda$ yields:

$$\frac{\partial f}{\partial \lambda} = -\frac{2\pi d_{MOE}}{\lambda^2} = -\frac{f}{\lambda}. \qquad \text{[Eqn. 12]}$$

For device 100, in which the chief ray of some emitter creates an angle of $a_0$ in the X-direction, a change of the effective focal length f affects the angle $a_0$ of emitters 114 (and, together with the $0^{th}$ orders, the other orders in each tile) The impact on the X-direction cosine $\alpha_0$ ($\alpha_0 = \cos(a_0)$) may be calculated by writing the direction cosines of the $0^{th}$ orders from Eqns. 1-2 as $$\alpha_0 = \frac{x}{\sqrt{x^2 + y^2 + z^2}}, \qquad \text{[Eqn. 13a]}$$

$$\beta_0 = \frac{y}{\sqrt{x^2 + y^2 + z^2}}, \text{ and} \qquad \text{[Eqn. 13b]}$$

$$\gamma_0 = \frac{z}{\sqrt{x^2 + y^2 + z^2}}. \qquad \text{[Eqn. 13c]}$$

(Eqns. 13a-c have been written in a general form, permitting the calculation for a general case in which the $0^{th}$ order has been tilted in both X- and Y-directions.)

Identifying the distance z between an emitter and the system exit pupil as the effective focal length of the MOE f, $\alpha_0$ may be differentiated at $z=f$ to yield:

$$\frac{\partial \alpha_0}{\partial z}\Big|_{z=f} = -\frac{xz}{\left(x^2 + y^2 + z^2\right)^{\frac{3}{2}}} = -\alpha_0 \gamma_0^2 \frac{1}{f}. \qquad \text{[Eqn. 14]}$$

By using Eqn. 14, a small change of the zero-order direction cosine (and the change of the diffracted order direction cosines) due to a change in the effective focal length may be calculated as $$\partial \alpha_0 = \frac{\partial \alpha_0}{\partial z}\Big|_{z=f} df. \qquad \text{[Eqn. 15a]}$$

In a general case, the impact on the Y-direction cosine $\beta_0$ may be calculated in a similar fashion to yield:

$$\partial \beta_0 = \frac{\partial \beta_0}{\partial z}\Big|_{z=f} df. \qquad \text{[Eqn. 15b]}$$

Combining Eqns. 8, 12, and 15 and the thermal behavior of emitters 114 with the recorded reference image $I_1$ (FIG. 1), the spot distributions for reference images $I_2, \ldots, I_N$ may be calculated for respective temperatures $T_2, \ldots, T_N$ and stored in memory 110.

Results of Correcting the Reference Image

Figure 10B:
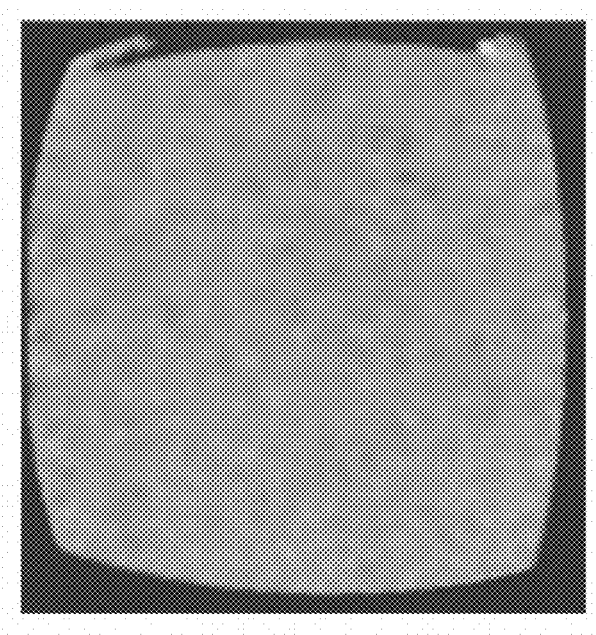
FIGS. 10A and 10B are schematic views of a projected spot pattern showing local disparities between a captured image and reference image of the spot pattern in NA-space before and after correcting for thermal effects on the reference image, in accordance with an embodiment of the invention.
Figure 10A:
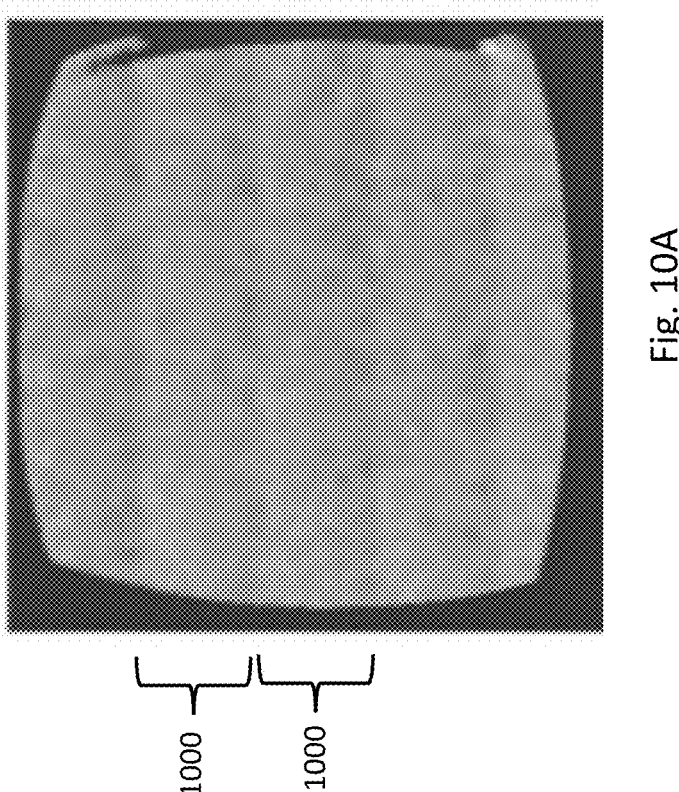

FIGS. 10A and 10B are schematic views of a projected spot pattern showing local disparities in NA space between a captured image of the projected spot pattern and a reference image before and after correcting for thermal effects on the reference image, in accordance with an embodiment of the invention.

FIG. 10A shows the disparities from a flat scene using device 100 and an uncorrected reference image, with the greyscale indicating the amount of disparity. The original reference image $I_{T1}$ was captured at a temperature $T_1=28.2°$ C., but the image IT from the flat scene was captured at a temperature $T=39.9°$ C. In order to emphasize the disparities, processor 108 ran the correlation computation for determining the disparities (the shift of the spots in image IT relative to the reference image I₁) only in the Y-direction. As the scene is known to be flat, a banding 1000 in the grayscale in FIG. 10A shows the disparities in the Y-direction due to the use of reference image I₁. Banding 1000 indicates that the effective focal length of MOE 116 had changed with temperature, leading to an expansion of the tiles and a concomitant overlap of adjacent tiles.

The disparities in FIG. 10B were obtained using a reference image I$_i$, which processor 108 computed for a temperature T$_i$=40.2° C. using the methods described hereinabove. No banding is observed in FIG. 10B, indicating that the use of a properly corrected reference image compensates for the thermal behavior of device 100.

The above temperature values are cited by way of example, and the principles of this embodiment and of the methods described above may similarly be applied over other temperature ranges.

Method of Operation

FIG. 11 is a flowchart 1200 that schematically illustrates a method for generating and using thermally corrected reference patterns for depth mapping, in accordance with an embodiment of the invention. This method is described below, for the sake of clarity and concreteness, with reference to the specific elements of device 100 and the techniques described above. Alternatively, the principles embodied in this method may be applied, mutatis mutandis, in correcting reference patterns that are used in depth mapping systems of other sorts.

In a reference start step 1202, device 100 starts generating the reference images. In a reference capture step 1204, a reference image I₁ is captured at temperature T₁, as described above with reference to FIG. 1. In a spot location step 1206, processor 108 finds the location of each spot in the reference image I₁ by, for example, computing the center of mass of each spot. In a spot identification step 1208, processor 108 identifies each spot in terms of its specific source emitter 114 (FIG. 1) and in terms of its diffraction order (i.e., to which tile, such as tile 404 in FIG. 4 it belongs). The spots are identified by comparing their locations to nominal spot locations. In a 0$^{th}$ order determination step 1210, processor 108 estimates the angle a₀ (FIG. 1) of the 0$^{th}$ order diffraction by comparing the location of the spots in a zero-order tile (such as tile 404a in FIG. 4) to a nominal (non-tilted) spot pattern. This computation may also utilize the spot location and identification data from steps 1206 and 1208.

In a reference image computation step 1212, processor 108 computes N–1 reference images I₂, . . . , I$_N$ for respective temperatures T₂, . . . , T$_N$. The temperatures T₂, . . . , T$_N$, together with T₁, are selected to cover the temperature range over which device 100 will be used. N is an integer selected to provide sufficient coverage of the temperature range, i.e., so that the error in depth measurement due to the discrete steps of temperatures T₁, . . . , T$_N$ is less than a predetermined error threshold. Processor 108 computes the reference images I₂, . . . , I$_N$ using the methods described above in the section entitled "Thermal behavior of the MOE-based depth mapping device." In a reference image storage step 1214, processor 108 stores the reference images I₁, . . . , I$_N$ in memory 110.

In an alternative embodiment, rather than precomputing the reference images as described above, a reference image can be computed "on-the-fly" during the measurement of the depth map, using the actual temperature of the projector at the time.

After storing the reference images in memory 110, device 100 is ready to commence depth measurements of one or more scenes. The depth measurements start in a measurement start step 1216. In an image capture step 1218 (described with reference to FIG. 2), camera 104 captures an image I of the spots formed on a scene (such as scene 200) by beams of optical radiation emitted by emitters 114 and projected onto the scene by MOE 116. In a temperature measurement step 1220, thermal sensor 106 measures the temperature T of projector 102. In a reference image selection step 1222, processor 108 selects, from among the N reference images I₁, . . . , I$_N$ in memory 110, the image I$_i$ whose associated temperature T₁ is closest to temperature T. In a depth computation step 1224, processor 108 computes the depth map of the scene by comparing image I to reference image I$_i$.

In a decision step 1226, processor 108 determines whether additional depth maps are to be measured. In case of a positive answer, device 100 returns to image capture step 1218. In case of a negative answer, the process ends in an end step 1228.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
operating a projector at a first temperature to project a pattern of optical radiation onto a reference plane, wherein the projector comprises one or more emitters, which emit respective beams of the optical radiation, and a metasurface optical element, which directs the beams to create the pattern;
capturing a first image of the projected pattern on the reference plane;
using the first image and an optical and thermal model of the projector, computing multiple reference images associated with different respective temperatures of the projector;
using the projector, projecting the pattern onto a scene;
measuring a temperature of the projector while projecting the pattern;
capturing a second image of the projected pattern on the scene;
selecting one of the reference images responsively to the measured temperature; and
computing a depth map of the scene by comparing the pattern in the second image to the selected one of the reference images.

2. The method according to claim 1, wherein selecting the one of the reference comprises selecting a reference image having a respective associated temperature that is closest to the measured temperature.

3. The method according to claim 1, wherein projecting the pattern comprises projecting multiple spots at respective locations, and wherein computing the multiple reference images comprises correcting the respective locations of the spots responsively to the respective temperatures.

4. The method according to claim 1, wherein the metasurface optical element is configured to split the beams to create multiple tiles within the pattern, each tile comprising a respective set of spots.

5. The method according to claim 1, wherein the metasurface optical element has an effective focal length, and wherein computing the multiple reference images comprises correcting the reference images for variations of the effective focal length of the diffractive optical element as a function of the respective temperatures.

6. The method according to claim 5, wherein the one or more emitters emit the respective beams at respective wavelengths, which vary with the temperature, and wherein correcting the reference images comprises correcting for further variations of the effective focal length of the metasurface optical element as a function of the wavelengths.

7. The method according to claim 1, wherein the projector comprises multiple emitters emitting the optical radiation at respective wavelengths, and wherein computing the multiple reference images comprises using a thermal model of the multiple emitters to compute changes in the respective wavelengths of the multiple emitters at the different respective temperatures.

8. The method according to claim 1, wherein computing the multiple reference images comprises modeling changes in the pattern at the different respective temperatures using a kinoform lens model in an NA-space.

9. A method for depth mapping, comprising:

operating a projector at a first temperature to project a pattern of optical radiation onto a reference plane;

capturing a first image of the projected pattern on the reference plane;

using the first image and an optical and thermal model of the projector, computing multiple reference images associated with different respective temperatures of the projector;

using the projector, projecting the pattern onto a scene;

measuring a temperature of the projector while projecting the pattern;

capturing a second image of the projected pattern on the scene;

selecting one of the reference images responsively to the measured temperature; and computing a depth map of the scene by comparing the pattern in the second image to the selected one of the reference images, wherein the projector comprises one or more emitters, which emit respective beams of the optical radiation, and an optical element that applies a tilt angle to the beams, wherein the tilt angle is dependent on the temperature and on a wavelength of the beams, and wherein computing the multiple reference images comprises correcting for variations in the tilt angle as a function of the temperature.

10. The method according to claim 9, wherein computing the multiple reference images comprises computing extended reference images comprising at least two spot patterns that are stitched together, wherein correcting for the variations in the tilt angle creates a smooth stitching between the at least two spot patterns.

11. A depth mapping device, comprising:

a projector, which is configured to project a pattern of optical radiation onto a field of view, wherein the projector comprises one or more emitters, which emit respective beams of the optical radiation, and a metasurface optical element, which directs the beams to create the pattern;

a camera, which is configured to capture images of the projected pattern within the field of view;

a thermal sensor configured to measure a temperature of the projector; and a processor, which is configured to receive from the camera a first image of the pattern projected onto a reference plane at a first measured temperature of the projector, to compute, using the first image and an optical and thermal model of the projector, multiple reference images associated with different respective temperatures of the projector, to receive from the camera a second image of the pattern projected onto a scene at a second measured temperature of the projector, to select one of the reference images responsively to the second measured temperature, and to compute a depth map of the scene by comparing the pattern in the second image to the selected one of the reference images.

12. The device according to claim 11, wherein the processor is configured to select a reference image having a respective associated temperature that is closest to the second measured temperature.

13. The device according to claim 11, wherein the pattern comprises multiple spots projected onto respective locations, and wherein the processor is configured to correct the respective locations of the spots in each of the multiple reference images responsively to the respective temperatures.

14. The device according to claim 11, wherein the metasurface optical element is configured to split the beams to create multiple tiles within the pattern, each tile comprising a respective set of spots.

15. The device according to claim 11, wherein the metasurface optical element has an effective focal length, and wherein the processor is configured to correct the reference images for variations of the effective focal length of the diffractive optical element as a function of the respective temperatures.

16. The device according to claim 11, wherein the projector comprises multiple emitters emitting the optical radiation at respective wavelengths, and wherein the processor is further configured to apply a thermal model of the multiple emitters to compute changes in the respective wavelengths of the multiple emitters at the different respective temperatures and to apply the computed changes in generating the reference images.

* * * * *